United States Patent [19]

Walter

[11] Patent Number: 4,568,827
[45] Date of Patent: Feb. 4, 1986

[54] LIGHT BARRIER APPARATUS

[75] Inventor: Arthur Walter, Waldkirch, Fed. Rep. of Germany

[73] Assignee: Erwin Sick GmbH Optik-Elektronik, Waldkirch, Fed. Rep. of Germany

[21] Appl. No.: 504,921

[22] Filed: Jun. 16, 1983

[30] Foreign Application Priority Data

Jun. 18, 1982 [DE] Fed. Rep. of Germany ....... 3222954

[51] Int. Cl.⁴ .............................................. H01J 5/02
[52] U.S. Cl. .................................... 250/239; 250/221
[58] Field of Search ..................... 250/239, 221, 222.1; 362/371

[56] References Cited

U.S. PATENT DOCUMENTS

| | | | |
|---|---|---|---|
| 3,535,539 | 10/1970 | Malespina et al. | 250/239 |
| 3,653,021 | 3/1972 | Litman et al. | 250/239 X |
| 4,331,868 | 5/1982 | Mash | 250/239 |
| 4,447,863 | 5/1984 | Fenne | 362/371 X |

FOREIGN PATENT DOCUMENTS

| | | |
|---|---|---|
| 1962054 | 7/1971 | Fed. Rep. of Germany . |
| 98262 | 5/1973 | Fed. Rep. of Germany . |
| 1077090 | 8/1976 | Fed. Rep. of Germany . |
| 595669 | 2/1978 | Switzerland . |

Primary Examiner—John P. McIntosh
Attorney, Agent, or Firm—Townsend and Townsend

[57] ABSTRACT

Figure 2:
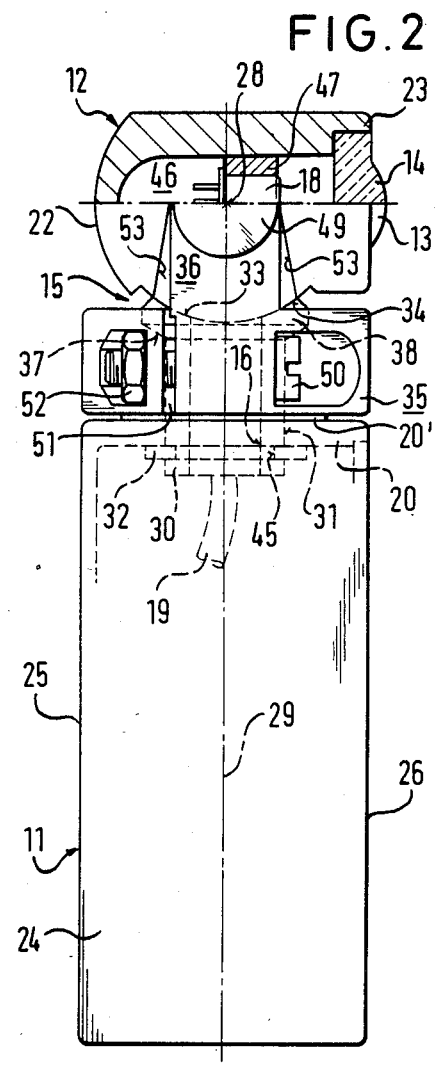

Light barrier apparatus arranged in a housing comprises at least one photoelectric converter, at least one front lens arranged in a wall of the housing, an electronic circuit connected to the photoelectronic converter(s), power supply lines leading from power supply terminals to the electronic circuit, and also, in the case of a receiver or a transmitter/receiver signal lines and signal terminals. The housing is subdivided into first and second housing parts (11, 12) which are pivotably connected together by an articulated coupling (15). The first housing part (11) contains, at least in large part, the electronic circuit including the power supply lines, power supply terminals and, if present, the signal lines and signal terminals. The second housing part contains at most a part of the electronic circuit, the electronic converter and also the front lens. The articulated coupling between the first and second housing parts has a passage (16) for accommodating the connecting lines (19) between the first and second housing parts (11, 12) (FIG. 2).

11 Claims, 7 Drawing Figures

U.S. Patent  Feb. 4, 1986  Sheet 1 of 3  4,568,827

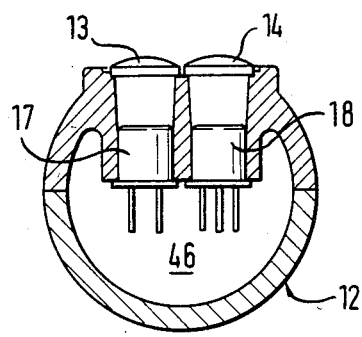
FIG. 6
FIG. 4
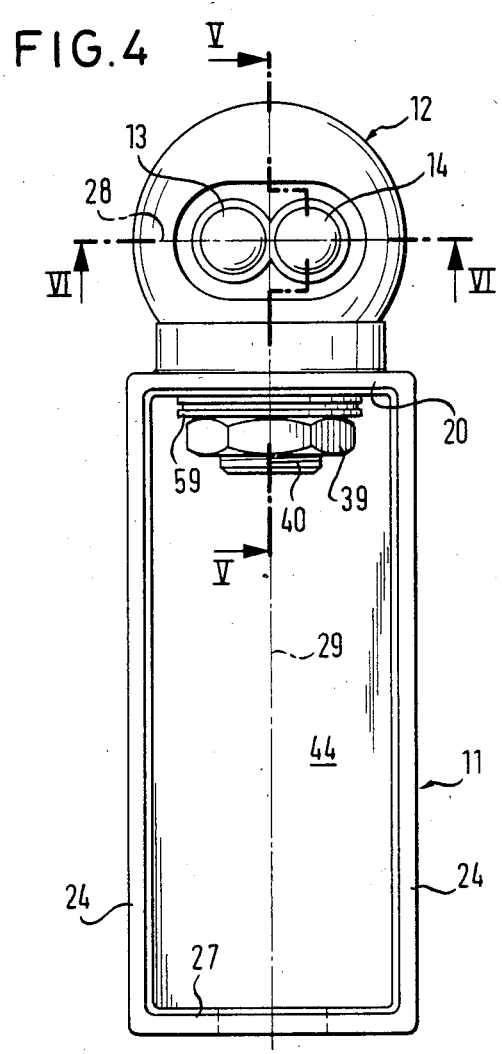
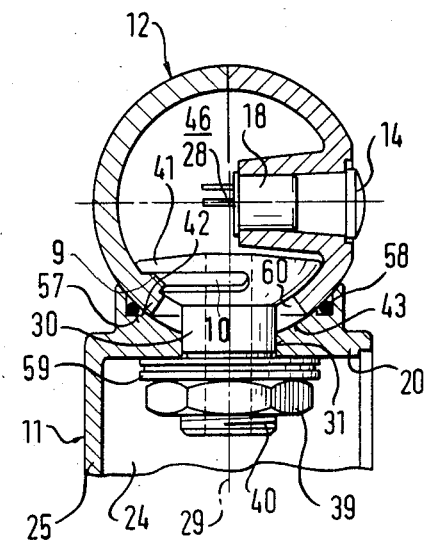
FIG. 5

LIGHT BARRIER APPARATUS

The invention relates to a light barrier apparatus comprising a housing, at least one photoelectronic converter, at least one front lens arranged in a wall of the housing, an electronic circuit connected to said at least one photoelectronic converter, power supply lines leading from power supply terminals to said electronic circuit, and also, in the case of a receiver or a transmitter/receiver, signal lines and signal terminals.

Customary light barrier apparatus is almost always constructed so that the optical parts are fixed components of the housing. The optical axis can thus neither be changed nor adjusted relative to the axes of the housing. An appropriate mount is required in order to allow the optical axis or the optical axes of light barrier apparatus of this kind to be aligned with a retroreflector, or in the case of a single path light barrier, to allow the transmitter to be aligned with the receiver and vice versa.

Light barrier apparatus is also already known in which the optical axis can be adjusted relative to the housing through a relatively small angular range. It is a disadvantage of the previously named kind of light barrier that the range of angular adjustment of the optical axis is relatively restricted. It is desirable, in particular with light barriers with a working range of up to hundreds of meters and with small transmission and reception cones, also to have the possibility of adjusting them through larger angular ranges. At the same time the housing should however also be of compact construction and be capable of being sealed in a gastight and watertight manner against the external environment.

The principal object underlying the invention is thus to provide a light barrier of the initially named kind the optical axis of which can be adjusted through a very large angular range relative to the housing, whereby both the need for a pivotal mount for the housing and the disadvantage of only a small range of adjustment should be avoided. Furthermore the light barrier apparatus of the invention should have small dimensions and be of compact construction. The manufacturing effort required to produce the light barrier apparatus should remain small. Furthermore it should be possible to lock the adjusted optical part in such a way that in practice the position of the selected optical axis no longer changes. Furthermore the light barrier should in practice be capable of being mounted in any desired position. The arrangement should be equally suitable for single path light barriers, for reflection light barriers and also for light scanners.

In order to satisfy this object the invention envisages that the housing is subdivided into first and second housing parts which are pivotably connected together by an articulated coupling; that the first part contains, at least in large part, the electronic circuit, including the power supply lines, power supply terminals and, if present, the signal lines and signal terminals; that the second housing part contains at most a part of the electronic circuit, the photoelectronic converter and also the front lens; and that the articulated coupling between the first and second housing parts has a passage for accommodating the connection lines between the first and second housing parts.

In this manner it is possible to rigidly and non-adjustably secure the first housing part to a suitable support whereupon the second housing part can be aligned relative to the first housing part in the desired manner by pivotal movement. The second housing part can contain either only a light transmitter, or only a light receiver or both a light transmitter and a light receiver. In the latter case the light barrier apparatus cooperates with a retroreflector arranged at a distance therefrom.

The first housing part thus requires only the simplest of securing means because it only needs to be immovably attached to a support. The connections can consist of cable connections, clamped connections or plugged connections. Any adjustment or indicating elements that are required should be provided in the first housing part. The optical and photoelectronic components (light source, light receiver in the form of a photoelectronic converter) are consciously not provided in the first housing part. The second housing part, which despite the articulated coupling can also be locked in any desired position relative to the first housing part, carries at least the front lens, or with an autocollimation light barrier the front lenses, and the photoelectronic component(s) (for example a luminous diode or a photoelectric converter). If necessary, parts of the receiver amplifier can also be housed in the second housing part.

The coupling between the two housing parts has a purely mechanical function however preferably also serves to accommodate the electrical connection lines between the two housing parts. The coupling is preferably so arranged that the inner spaces of the two housing parts are indeed connected together but are sealed against the external environment.

The second housing part is preferably smaller than the first housing part and arranged at an end wall thereof.

A further embodiment is characterised in that the sidewalls, and also the front and rear walls, of the second housing part do not project beyond the side, front and rear walls of the first housing part when aligned therewith and are preferably flush therewith. Thus, in this embodiment, the two housing parts jointly form a compact arrangement which resembles a single housing, however despite this the aforementioned adjustability and lockability are ensured.

An advantageous practical embodiment is characterised in that the first housing part has the form of a parallelepiped with four preferably equally broad sidewalls and two square end walls.

Furthermore it is expedient if the second housing part has substantially the shape of a parallelepiped, preferably with a rounded rear wall, or substantially the form of a sphere.

An expedient division of space between the two housing parts is obtained when the height of the second housing part mounts to from $\frac{1}{2}$ to $\frac{1}{4}$ and in particular to approximately $\frac{1}{3}$ of the height of the first housing part.

A particularly preferred embodiment is constructed so that the articulated coupling is a universal coupling having first and second pivot axes disposed at right angles to one another, one of which extends at right angles to the connecting surface between the first and second housing parts and the other of which extends parallel to the connecting surface. With this arrangement adjustment of the optical axis or axes can be effected in two directions.

Furthermore it is advantageous if the two pivot axes of the universal coupling intersect as close as possible to the photoelectronic component(s).

The universal coupling can include a tubular spigot in which the passage is provided, with the tubular spigot passing through a bore of the end wall of the first housing part and being secured against withdrawal by an abutment ring.

In a particularly practical embodiment the invention envisages that the tubular spigot has a concave right cylindrical guide surface at its outer end, said concave guide surface contacting a complementary, convex, right cylindrical guide surface at the underside of the second housing part, with the convex guide surface being concentric to the second pivot axis, and that a holder is rotatably secured to the tubular spigot, the holder supporting the second housing part for movement about the second pivot axis.

The holder is preferably a clamping ring which is essentially flush with the side, rear and front walls of the first housing part, with two retaining arms for the pivotal attachment of the second housing part about the second pivot axis being arranged on the holder.

In order to achieve both locking and ideal sealing of the tubular spigot relative to the two housing parts an advantageous further development of this embodiment is constructed so that the clamping ring is braced at one side against the neighbouring end wall of the first housing part and at the other side against an inclined annular surface of an end flange of the tubular spigot, in such a way that as the clamping of the clamp ring increases the tubular spigot is subjected to an increasing tension in the direction towards the second housing part.

In another practical embodiment of the invention the tubular spigot is drawn towards the first housing part by a nut screwed onto an end thread of the tubular spigot, and the tubular spigot has a flange inside the second housing part, with the flange pressing a convex spherical surface concentric with the second pivot axis from the inside against a complementary concave spherical surface at the end wall of the first housing part.

Figure 3:
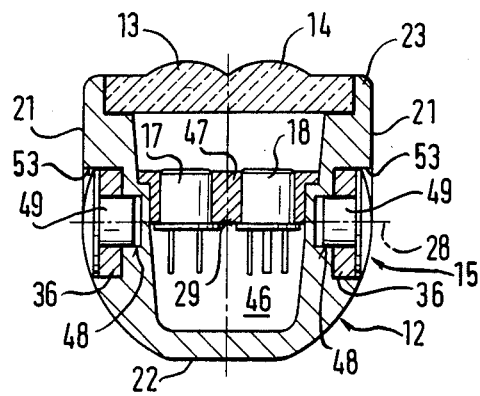
Figure 1:
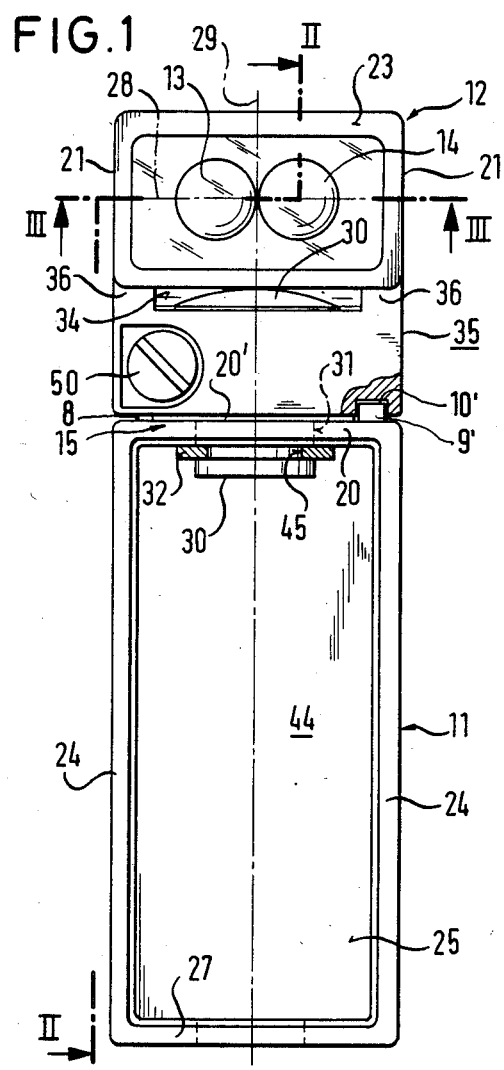
Figure 7:
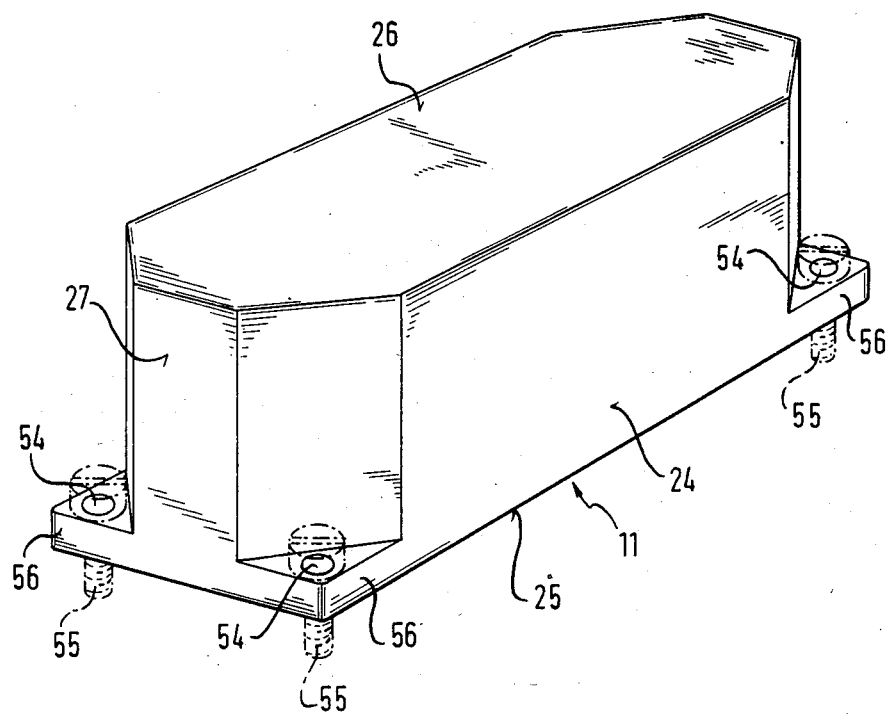

The invention will now be described in the following by way of example and with reference to the drawings which show:

FIG. 1 a front view of a first embodiment of a light barrier,

FIG. 2 a partially sectioned side view of the apparatus of FIG. 1, taken on the line II—II of FIG. 1, FIG. 3 a section along the line III—III of FIG. 1, FIG. 4 a front view of a further embodiment of a light barrier, FIG. 5 a section on the line V—V of FIG. 4, FIG. 6 a section on the line VI-VI of FIG. 4, and FIG. 7 a perspective view of a preferred embodiment of the first housing part of a light barrier apparatus viewed obliquely from the side and from beneath.

As seen in FIGS. 1 to 3 a light barrier apparatus which cooperates with a retroreflector (not shown) is equipped with a light emitting diode 17 and a photoelectric converter 18. The light barrier apparatus has a first housing part 11 in the form of a parallelepiped and a second housing part 12 which is substantially aligned with the first housing part 11 and connected thereto via a universal coupling 15. The front wall 26 of the housing has been omitted in FIG. 1 in order to show the inner chamber 44 provided for accommodating the electronic circuit including the power supply lines, the power supply terminals, and also the signal lines and the signal terminals. All these assemblies have however been omitted from this inner space 44 for the purpose of illustration. Apart from the front wall 26 the housing has two side walls 24, which are likewise rectangular in the illustrated manner, and also a rear wall 25 and two square end walls 20, 27.

A circular bore 31 is provided in the upper end wall 20 of the first housing part 11. A tubular spigot 30 extends upwardly through this circular bore coaxially to the axis 29 of the housing part 11. An abutment ring 32 sits in an annular groove 45 at the lower end of the tubular spigot 30. The diameter of the abutment ring 32 is larger than that of the bore 31 and the ring contacts the end wall 20 from beneath.

At its upper end the tubular spigot 30 has an annular flange 38 the end face of which remote from the housing part 11 is constructed as a right cylindrical slide surface 33 with the axis 28 as the axis of the cylinder. A complementary convex right cylindrical slide surface 34 provided at the lower side of the second housing part 12 sits on this concave right cylindrical slide surface 33.

The second housing part contains a chamber 46 which receives a partition wall 47 in which the light emitting diode 17 and the photoelectric converter are arranged in the illustrated manner. The front side of the housing part 12 is closed by two front lenses 13, 14 which are constructed as a unit with the light emitting diode 17 and the photoelectric converter 18 being located at the focal points of the two front lenses.

The sidewalls 21 and also the front and rear walls 22 and 23 of the second housing part 12 are aligned in the position shown in FIGS. 1 and 2 with the front and rear walls 25, 26 of the first housing part 11. The rear wall 22 of the second housing part 12, which likewise has substantially the shape of a parallelepiped, is rounded in the manner which can be seen in FIG. 2.

In the area of the pivot axis 28 the second housing part 12 has lateral bores 48 (FIG. 3). Pivots 49 supported by lateral retaining arms 36 engage in the lateral bores 48.

The lateral retaining arms are formed on a holder constructed as a clamping ring 35 and extend parallel to the central axis 29 of the two housing parts 11, 12. The pivots 49 can be formed on headed pins which engage in corresponding bores in the retaining arms 36.

The clamping ring 35 has a clamping slot 51 which is bridged by a clamping screw 50 and surrounds the tubular spigot 30, which has an axial passage 16 for accommodating the connection lines 19 indicated in FIG. 2.

The flange 38 of the tubular spigot 30 has an inclined annular surface 37, which can be seen in FIG. 2, at its lower edge which faces the first housing part 11. This inclined annular surface 37 cooperates with a mating counter-surface of the clamping ring 35. The other endface of the clamping ring 35 contacts the end wall 20, or a projection 20' arranged thereon.

If the screw 50 is now screwed into a nut 52 provided at the other end of the screw bore, in order to contract the slot 51, the upper end surface of the clamping ring 35 slides along the annular inclined surface 37 of the flange 38 of the tubular spigot 30 so that the clamping ring is braced against the end wall 20 or the projection 20' of the lower housing part 11. In this way the tubular spigot 30 is drawn upwardly away from the first housing part 11 and the abutment ring 32 securely contacts the end wall 20. If desired the abutment ring 32 can also be provided with sealing characteristics so that this pressure results in a reliable seal of the inner chamber 44 of the first housing part against the external environment. At the same time this clamping process results in the concave right cylindrical guide surface 33 being pressed against the contacting convex right cylindrical guide surface 34 of the second housing part 12 where sealing means can likewise be provided. This pressure results not only in the selected adjustment being fixed, and indeed in both directions, but also in a seal between the two relatively movable surfaces.

In accordance with the invention the lateral retaining arms 36 are accommodated in lateral recesses 53 of the second housing part 12 so that they do not project externally beyond the sidewalls 21, 24 of the housing parts 11, 12. As FIG. 2 shows the lateral recesses 53 are more less of sector-like construction so that the second housing part 12 can be pivoted as far as desired about the second pivot axis 28.

After loosening the screw 50 it is not only possible to pivot the second housing part 12 about the transverse pivot axis 28 but also about the central axis 29 of the housing.

In order to reliably secure the lower housing part 11 to a support, the corners of the second housing part are preferably shaped in the manner illustrated in perspective in FIG. 7. Accordingly attachment projections 56 which do not project beyond the walls, and which are of smaller depth than the walls, are provided at the four corners. Attachment bores 54 are arranged in the attachment projections 56 and securing bolts 55 can be inserted through these attachment bores to secure the housing part 12 to a wall or other support (not illustrated).

After the lower housing part 11 has been secured to a support using the attachment projections shown in FIG. 7, the second housing part 12 is accurately aligned with the associated retroreflector by pivotal movement about the axes 28, 29. The screw 50 is subsequently tightened whereupon the selected adjustment is fixed and the relatively movable surfaces of the housing parts 11 and 12 and of the universal coupling 15 are sealingly pressed together.

The assembly of the light barrier apparatus is expediently effected by first inserting the tubular spigot 30 from above into the clamping ring 30 and then pushing it through the end wall 20. The abutment ring 32 is then mounted and the second housing part 12 attached to the retaining arms 36.

In the embodiment of FIGS. 4 to 6 parts which have counterparts in the preceding embodiment are designated with the same reference numerals.

In distinction to the embodiment described with reference to FIGS. 1 to 3 the second housing part 12 is of substantially spherical shape with the two pivot axes 28, 29 intersecting at the center of the spherical housing 12. The front lenses 13, 14 are arranged alongside one another in the wall of the spherical housing part 12 and the light emitting diode 17 and the photoelectric converter 18 are arranged in the manner shown in the drawing behind the front lenses 13, 14.

At its side facing the first housing part 11 the housing part 12 has a convex spherical surface 42 which contacts a complementary concave spherical surface 43 which is formed at the side of the end wall 20 facing the housing part 12. A sealing ring 58 is arranged in an annular groove 57 of the concave spherical surface 43. The sealing ring 58 contacts the convex spherical surface 42 and seals the movable surfaces against the external environment.

The tubular spigot 30 extends again through the bore 31 in the end wall 20. A sealing disk 59 is pressed against the lower side of the end wall 20 by a nut 39 screwed onto a thread 40 of the tubular spigot 30. At its opposite end, within the inner chamber 46 of the second housing part 11, the tubular spigot 30 has a flange 41 which contacts a surface surrounding a circular opening 60 of the housing part 12 from the inside. In this manner the convex spherical surface 42 of this spherical housing part 12 is pressed against the concave spherical surface 43 of the housing part 11 via the spring flange 41 on tightening the nut 39.

As a result of the resilient characteristics of the seal ring 59 the spherical housing 12 can be pivoted against a preadjustable resistance around the pivot axes 28 or 29. The possible pivot angle about the transverse axis 28 is determined in this arrangement by the size of the circular opening 60.

In accordance with the invention a restricted peripheral groove 10 is located in the flange 41 and cooperates with an inwardly projecting post 9 of the housing part 12. As a result of the restricted length of the groove 10 in the peripheral direction the post 9 meets end abutments on rotation of the housing part 12 about the axis 29. The range of rotation of the housing part 12 can be restricted in this way to a desired value.

In the illustration of FIG. 5 the post 9 is exactly as broad as the groove 10 so that a pivotal movement about the horizontal axis 28 is not possible in this representation.

However, by making the post 9 smaller, or by making the groove 10 broader it is also possible to obtain a desired, restricted, pivot angle about the axis 28.

In FIG. 1 the lower housing part 11 has an upwardly projecting post 9' which engages in a circular groove 10' at the lower side of the upper housing part 12. The groove 10' is also restricted in the peripheral direction in order to limit the range of pivotal movement of the housing 12 at both sides.

The seal between the two parts of the housing does not have to take place in the region of the annular disc 32; it is also possible for an annular seal to be arranged between the two housing parts in the intermediate space 8 with this seal being pressed against the lower housing part 11 by the clamping ring 35 on tightening the screw 50. This is also an expedient further development of the invention.

The socket which accommodates the photoelectric components 17, 18 should have a greater spacing from the flange 41 than illustrated in FIG. 5 if a larger pivot angle is desired about the transverse axis 28.

I claim:
1. Light barrier apparatus comprising:
a housing, a photoelectric device (17, 18), a front lens (13, 14) arranged in a wall (23) of said housing, said housing being subdivided into first and second housing parts (11, 12), said first housing part containing connection lines (19) extending from the photoelectric device, said second housing part containing said photoelectric device and said front lens, said first and second housing parts being connected together by an articulated universal coupling (15) having first and second pivot axes (28, 29) disposed at right angles to one another, said universal coupling comprising a spigot (30) one end of which passes through a bore (31) of an end wall (20) of said first housing part, the one end of said spigot being secured to said first housing part, an outer end of said spigot (30) having a curved guide surface (33) contacting a complementary curved guide surface (34) of said second housing part, with said guide surfaces (33, 34) defining at least said first pivot axis and in that locking means are provided bracing said first and second housing parts in a longitudinal direction of said spigot for pressing together said coacting guide surfaces (33, 34).

2. Light barrier apparatus of claim 1 wherein the photoelectric device includes a light emitter (17) and a photoelectric converter (18).

3. Light barrier apparatus in accordance with claim 1 wherein said spigot (30) is a tubular spigot having a passage (16) for accommodating the connection lines (19) between said first and second housing parts (11, 12).

4. Light barrier apparatus in accordance with claim 1 wherein said first pivot axis (28) extends parallel to a connecting surface of said end wall (20) between said first and second housing parts (11, 12) and said second pivot axis (29) extends at a right angle to said connecting surface.

5. Light barrier apparatus in accordance with claim 4 wherein said first and second pivot axes (28, 29) of said universal coupling (15) intersect close to the photoelectric device (17, 18).

6. Light barrier apparatus in accordance with claim 1 wherein:
   said guide surface (33) at the outer end of said spigot (30) is a concave right cylindrical guide surface contacting a complementary, convex, right cylindrical guide surface (34) at an underside of said second housing part (12), with said convex guide surface (34) being concentric to said first pivot axis (28); and
   wherein said locking means includes a holder (35) supporting said second housing part for pivotal movement about said first pivot axis, said holder being secured to and rotatable with said spigot.

7. Light barrier apparatus in accordance with claim 6 wherein said holder includes:
   a clamping ring (35) having portions substantially flush with the side, rear and front walls (24, 25, 26) of said first housing part (11); and
   two retaining arms (36) for the pivotal attachment of said second housing part (12) about the first pivot axis (28).

8. Light barrier apparatus in accordance with claim 7 wherein said clamping ring (35) is braced at one side against a neighboring endwall (20) of said first housing part (11) and the other side against an inclined annular surface (37) of an end flange (38) of said spigot (30) so that tightening the clamping ring subjects said tubular spigot to an increasing tension in a direction towards the second housing part (12).

9. Light barrier apparatus in accordance with claim 1 wherein the spigot (30) is a tubular spigot and wherein said locking means includes a nut (39), said spigot being drawn towards said first housing part (11) by the nut (39) screwed onto an end housing (40) of said tubular spigot and in that said tubular spigot has a flange (41) inside said second housing part (12), with said flange pressing on a concave spherical surface of said second housing part, said concave spherical surface being concentric with said first pivot axis (28).

10. Light barrier apparatus in accordance with claim 9 wherein said second housing part (12) and said end wall (20) have complementary abutting spherical surfaces (42, 43) provided with sealing means (58).

11. Light barrier apparatus in accordance with claim 1 wherein said guide surfaces (33, 34) are provided with sealing means.

* * * * *